(12) United States Patent
Ogawa

(10) Patent No.: US 10,895,469 B2
(45) Date of Patent: Jan. 19, 2021

(54) HYBRID VEHICLE AND METHOD OF CONTROLLING HYBRID VEHICLE

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 16/102,975

(22) Filed: Aug. 14, 2018

(65) Prior Publication Data

US 2019/0092185 A1 Mar. 28, 2019

(30) Foreign Application Priority Data

Sep. 26, 2017 (JP) .................. 2017-184579

(51) Int. Cl.
| | |
|---|---|
| *B60L 50/16* | (2019.01) |
| *G01C 21/36* | (2006.01) |
| *B60L 58/13* | (2019.01) |
| *G01C 21/34* | (2006.01) |
| *B60W 20/12* | (2016.01) |
| *B60K 6/445* | (2007.10) |
| *B60W 10/06* | (2006.01) |
| *B60W 10/08* | (2006.01) |
| *B60W 10/26* | (2006.01) |

(52) U.S. Cl.
CPC .......... *G01C 21/3658* (2013.01); *B60K 6/445* (2013.01); *B60L 50/16* (2019.02); *B60L 58/13* (2019.02); *B60W 10/06* (2013.01); *B60W 10/08* (2013.01); *B60W 10/26* (2013.01); *B60W 20/12* (2016.01); *G01C 21/3469* (2013.01); *B60W 2510/244* (2013.01); *B60W 2554/00* (2020.02); *B60W 2710/244* (2013.01); *B60W 2710/248* (2013.01)

(58) Field of Classification Search
USPC ........................................ 701/533
See application file for complete search history.

(56) References Cited

U.S. PATENT DOCUMENTS

| | | | | |
|---|---|---|---|---|
| 2007/0208467 A1* | 9/2007 | Maguire | .................. | B60K 6/48 701/22 |
| 2009/0012664 A1* | 1/2009 | Christ | .................... | B60L 1/003 701/22 |
| 2011/0071712 A1* | 3/2011 | Mizuno | .................... | B60K 6/46 701/22 |
| 2016/0096521 A1* | 4/2016 | Jang | ........................ | B60L 58/13 |
| 2017/0144648 A1* | 5/2017 | Blasinski | .............. | B60W 10/30 |

(Continued)

FOREIGN PATENT DOCUMENTS

| | | |
|---|---|---|
| JP | 2011-63186 A | 3/2011 |
| JP | 2011-134195 A | 7/2011 |

(Continued)

*Primary Examiner* — James M McPherson
(74) *Attorney, Agent, or Firm* — Sughrue Mion, PLLC

(57) ABSTRACT

An electronic control unit is configured to continue execution of the charge control until the hybrid vehicle passes a branch point between the congestion go-through route and the congestion avoidance route, when the electronic control unit changes the scheduled traveling route from a congestion go-through route including the congestion zone, to a congestion avoidance route for avoiding the congestion zone, during execution of the charge control.

6 Claims, 6 Drawing Sheets

(56) References Cited

U.S. PATENT DOCUMENTS

2017/0334307 A1* 11/2017 Miro-Padovani ............................ B60W 50/0097
2019/0071068 A1* 3/2019 Shin ...................... B60W 20/12

FOREIGN PATENT DOCUMENTS

| JP | 2014-015125 A | | 1/2014 |
| JP | 201424500 A | * | 2/2014 |
| JP | 2017-124719 A | | 7/2017 |
| JP | 2017-136938 A | | 8/2017 |

* cited by examiner

HYBRID VEHICLE AND METHOD OF CONTROLLING HYBRID VEHICLE

INCORPORATION BY REFERENCE

The disclosure of Japanese Patent Application No. 2017-184579 filed on Sep. 26, 2017 including the specification, drawings and abstract is incorporated herein by reference in its entirety.

BACKGROUND

1. Technical Field

The disclosure relates to a hybrid vehicle, and more particularly to a hybrid vehicle including an engine, a motor, and a power storage device, and to a method of controlling the hybrid vehicle.

2. Description of Related Art

One example of this type of hybrid vehicle is proposed (see, for example, Japanese Unexamined Patent Application Publication No. 2017-124719 (JP 2017-124719 A)), which includes an engine, a motor, and a secondary battery, and controls the engine and the motor, based on a target charging rate of the secondary battery, so as to control the charging rate of the secondary battery. When a controller of the hybrid vehicle detects a traffic congestion zone in the traveling direction of the vehicle on a predicted traveling route (route used for route guidance), the controller changes the target charging rate of the secondary battery from a basic target charging rate, to a special target charging rate that is higher than the basic target charging rate, at a point located ahead of a start point of the congestion zone. Then, the controller returns the target charging rate of the secondary battery from the special target charging rate to the basic target charging rate, at an end point of the congestion zone. In the hybrid vehicle with the controller as described above, the engine is positively driven even in the congestion zone. As a result, in the congestion zone, the charging rate of the secondary battery is less likely or unlikely to reach its lower limit, and forced charge of the secondary battery is less likely or unlikely to take place.

SUMMARY

In the hybrid vehicle as described above, when the controller detects a traffic congestion zone in the traveling direction of the vehicle on the predicted traveling route, it may search for a congestion avoidance route that circumvents the congestion zone, and may change the predicted traveling route from a congestion go-through route including the congestion zone to the congestion avoidance route. If the target charging rate of the secondary battery is immediately changed to the basic target charging rate, when the predicted traveling route is changed to the congestion avoidance route while the targeting charging rate of the secondary battery is set to the special target charging rate, the charging rate of the secondary battery may not be made sufficiently high when the driver does not notice a change of the predicted traveling route to the congestion avoidance route, or ignores the change, and continues to have the vehicle travel on the congestion go-through route, and enter the congestion zone. In this case, in the congestion zone, the charging rate of the secondary battery may reach the lower limit, and forced charge of the secondary battery may take place.

A hybrid vehicle according to the disclosure makes it less likely or unlikely to cause forced charge of a power storage device in a traffic congestion zone.

The hybrid vehicle of the disclosure employs means as described below.

An example aspect of the disclosure is a hybrid vehicle. The hybrid vehicle includes: an engine; a motor connected to an output shaft of the engine; a power storage device configured to supply and receive electric power to and from the motor; and an electronic control unit configured to provide route guidance of a scheduled traveling route, perform charge control for controlling the engine and the motor such that a power storage ratio of the power storage device when the electronic control unit determines that the scheduled traveling route includes a congestion zone based on congestion information is higher than a power storage ratio of the power storage device when the electronic control unit determines that the scheduled traveling route does not include the congestion zone based on the congestion information, from a first point in time at which the hybrid vehicle passes a point located ahead of a start point of the congestion zone, to a second point in time at which the hybrid vehicle passes a predetermined point, and continue execution of the charge control until the hybrid vehicle passes a branch point between a congestion go-through route and a congestion avoidance route, when the electronic control unit changes the scheduled traveling route from the congestion go-through route including the congestion zone, to the congestion avoidance route for avoiding the congestion zone, during execution of the charge control.

An example aspect of the disclosure is a method of controlling a hybrid vehicle. The hybrid vehicle includes an engine, a motor connected to an output shaft of the engine, a power storage device configured to supply and receive electric power to and from the motor, and an electronic control unit. The method includes: providing, by the electronic control unit, route guidance of a scheduled traveling route; performing, by the electronic control unit, charge control for controlling the engine and the motor such that a power storage ratio of the power storage device when the electronic control unit determines that the scheduled traveling route includes a congestion zone based on congestion information is higher than a power storage ratio of the power storage device when the electronic control unit determines that the scheduled traveling route does not include the congestion zone based on congestion information, from a first point in time at which the hybrid vehicle passes a point located ahead of a start point of the congestion zone, to a second point in time at which the hybrid vehicle passes a predetermined point; and continuing, by the electronic control unit, execution of the charge control until the hybrid vehicle passes a branch point between a congestion go-through route and a congestion avoidance route, when the electronic control unit changes the scheduled, traveling route from the congestion go-through route including the congestion zone, to the congestion avoidance route for avoiding the congestion zone, during execution of the charge control.

In the hybrid vehicle of this disclosure, the electronic control unit provides route guidance to guide a driver of the vehicle along the scheduled traveling route. When the electronic control unit determines that the scheduled traveling route includes a traffic congestion zone, based on congestion information, it performs charge control for controlling the engine and the motor such that the power storage ratio of the power storage device becomes higher than that in the case where it is determined that the scheduled traveling route includes no congestion zone, from the time when the vehicle passes a point located ahead of the start point of the congestion zone, to the time when the vehicle passes the predetermined point. In the hybrid vehicle that performs the above control, when the electronic control unit changes the scheduled traveling route from the congestion go-through route including the congestion zone, to the congestion avoidance route for avoiding the congestion zone, during execution of the charge control, it continues execution of the charge control until the vehicle passes the branch point between the congestion go-through route and the congestion avoidance route. Accordingly, even if the scheduled traveling route is changed to the congestion avoidance route during execution of the charge control, the electronic control unit continues to perform the charge control until the vehicle passes the branch point. If the vehicle keeps traveling on the congestion go-through route after it passes the branch point, and the scheduled traveling route is re-changed to the congestion go-through route, the electronic control unit further continues to perform the charge control. In this case, execution of the charge control is continued (not interrupted) until the vehicle enters the congestion zone. Thus, when the driver does not notice a change of the scheduled traveling route to the congestion avoidance route, or ignores the change, and the vehicle continues to travel on the congestion go-through route, and enters the congestion zone, the power storage ratio of the power storage device can be made sufficiently high, by the time when the vehicle enters the congestion zone. As a result, in the congestion zone, the power storage ratio of the power storage device can be prevented from becoming equal to or smaller than a threshold value at which forced charge is required, and forced charge of the power storage device can be prevented from taking place. Here, the "predetermined point" may be an end point of the congestion zone, or may be a start point of the congestion zone, or may be a point slightly ahead of the end point of the congestion zone.

The electronic control unit may be configured to finish execution of the charge control, when the scheduled traveling route is the congestion avoidance route after the hybrid vehicle passes the branch point. It is thus possible to prevent execution of the charge control from being continued wastefully, by finishing execution of the charge control.

The electronic control unit may be configured to perform the charge control such that the power storage ratio of the power storage device when the scheduled traveling route is changed to the congestion avoidance route is lower than the power storage ratio of the power storage device when the scheduled traveling route remains the congestion go-through route, until the hybrid vehicle passes the branch point. When the scheduled traveling route is changed to the congestion avoidance route, it is unknown, until the vehicle passes the branch point, which of the congestion go-through route and the congestion avoidance route the vehicle will travel on after the vehicle passes the branch point. Thus, it may be considered to perform the above control, in view of a possibility that the vehicle travels on the congestion avoidance route.

The electronic control unit may perform the charge control, by controlling the engine and the motor so as to reduce a threshold value for starting the engine, and increase electric power with which the battery is charged, as compared with the time when the charge control is not performed, thereby to increase the power storage ratio of the power storage device. The predetermined point may be selected from an end point of the congestion zone, a start point of the congestion zone, and a point located ahead of the end point of the congestion zone.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
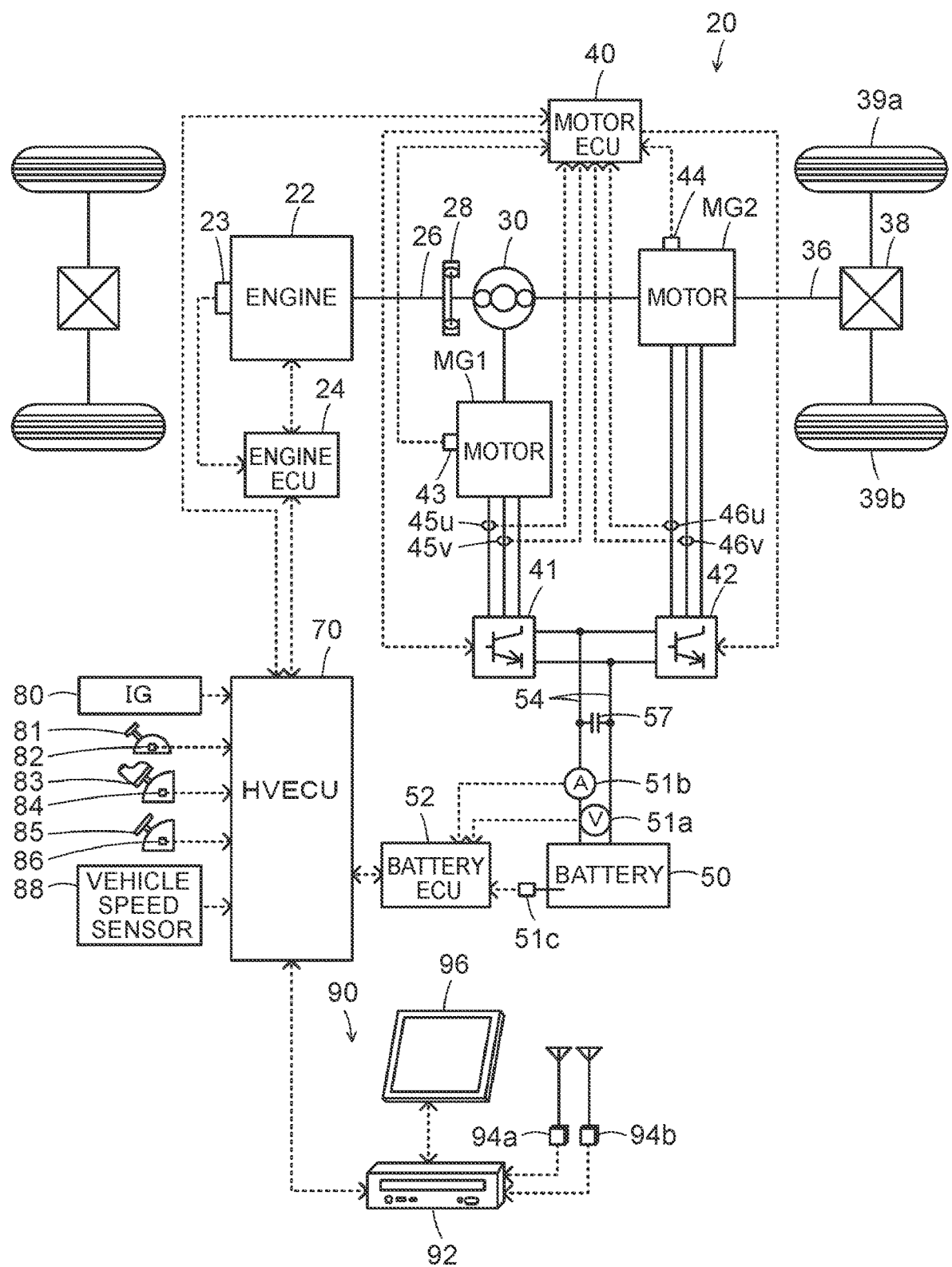
FIG. 1 is a view schematically showing the configuration of a hybrid vehicle as one embodiment of the invention.

Next, one embodiment of the invention will be described. FIG. 1 schematically shows the configuration of a hybrid vehicle 20 as one embodiment of the invention. As shown in FIG. 1, the hybrid vehicle 20 of the embodiment includes an engine 22, a planetary gear set 30, motors MG1, MG2, inverters 41, 42, a battery 50 as a power storage device, a navigation system 90, and an electronic control unit for the hybrid vehicle (which will be referred to as "HVECU") 70.

The engine 22 is constructed as an internal combustion engine that generates power, using gasoline or light oil as fuel. The engine 22 is connected to a carrier of the planetary gear set 30 via a damper 28. The operation of the engine 22 is controlled by an electronic control unit for the engine (which will be referred to as "engine ECU") 24.

Although not illustrated in the drawings, the engine ECU 24 is configured as a microprocessor having a CPU as a main component, and includes a ROM that stores processing programs, a RAM that temporarily stores data, input and output ports, and a communication port, as well as the CPU. The engine ECU 24 receives signals from various sensors, which are needed for controlling an operation of the engine 22, via the input port. For example, the engine ECU 24 receives a crank angle θcr, from a crank position sensor 23 that detects the rotational position of a crankshaft 26 of the engine 22, via the input port. The engine ECU 24 outputs various control signals for controlling the operation of the engine 22, via the output port. The engine ECU 24 is connected to the HVECU 70 via the communication port. The engine ECU 24 computes the rotational speed Ne of the engine 22, based on the crank angle θcr from the crank position sensor 23.

The planetary gear set 30 is constructed as a single-pinion type planetary gear mechanism. A rotor of the motor MG1 is connected to a sun gear of the planetary gear set 30. A drive shaft 36 coupled to drive wheels 39a, 39b via a differential gear 38 is connected to a ring gear of the planetary gear set 30. As described above, the crankshaft 26 of the engine 22 is connected to a carrier of the planetary gear set 30, via the damper 28.

The motor MG1 is in the form of a synchronous generator-motor, for example, and its rotor is connected to the sun gear of the planetary gear set 30, as described above. The motor MG2 is in the form of a synchronous generator-motor, for example, and its rotor is connected to the drive shaft 36. The inverters 41, 42 are used for driving the motors MG1, MG2, and are connected to the battery 50 via a power line 54. A smoothing capacitor 57 is mounted to the power line 54. An electronic control unit for the motors (which will be called "motor ECU") 40 controls switching of a plurality of switching devices (not shown) in the inverters 41, 42, so as to rotate or drive the motors MG1, MG2.

Although not illustrated in the drawings, the motor ECU 40 is configured as a microprocessor having a CPU as a main component, and includes a ROM that stores processing programs, a RAM that temporarily stores data, input and output ports, and a communication port, as well as the CPU. The motor ECU 40 receives signals from various sensors, which are needed for controlling a driving of the motors MG1, MG2, via the input port. For example, the motor ECU 40 receives rotational positions θm1, θm2 from rotational position detection sensors 43, 44 that detect the rotational positions of rotors of the motors MG1, MG2, phase currents Iu1, Iv1, Iu2, Iv2 from current sensors 45u, 45v, 46u, 46v that detect current flowing in respective phases of the motors MG1, MG2, and so forth. The motor ECU 40 outputs switching control signals to the switching devices of the inverters 41, 42, and so forth, via the output port. The motor ECU 40 is connected to the HVECU 70 via the communication port. The motor ECU 40 computes electric angles θe1, θe2, angular velocities ωm1, ωm2, and rotational speeds Nm1, Nm2 of the motors MG1, MG2, based on the rotational positions θm1, θm2 of the rotors of the motors MG1, MG2 from the rotational position detection sensors 43, 44.

The battery 50 is in the form of a lithium-ion secondary battery or a nickel hydride secondary battery, for example, and is connected to the power line 54. The battery 50 is managed by an electronic control unit for the battery (which will be referred to as "battery ECU") 52.

Although not illustrated in the drawings, the battery ECU 52 is configured as a microprocessor having a CPU as a main component, and includes a ROM that stores processing programs, a RAM that temporarily stores data, input and output ports, and a communication port, as well as the CPU. The battery ECU 52 receives signals from various sensors, which are needed for managing the battery 50, via the input port. The signals received by the battery ECU 52 include voltage Vb of the battery 50 from a voltage sensor 51a mounted between terminals of the battery 50, current Ib of the battery 50 from a current sensor 51 mounted to an output terminal of the battery 50, and the temperature Tb of the battery 50 from a temperature sensor 51c mounted to the battery 50. The battery ECU 52 is connected to the HVECU 70 via the communication port. The battery ECU 52 computes the power storage ratio SOC, based on an integrated value of the current Ib of the battery 50 from the current sensor 51b. The power storage ratio SOC is the ratio of the capacity of electric power that can be discharged from the battery 50 to the full capacity of the battery 50.

The navigation system 90 includes a main body 92, a GPS antenna 94a, a VICS (registered trademark: ™) antenna 94b, and a display 96 of a touch panel type. The main body 92 incorporates a controller having a storage medium, such as a hard disk, in which map information, etc. are stored, input and output ports, and a communication port. The GPS antenna 94a receives information concerning the current location of the vehicle (hybrid vehicle) in question (which will be called "subject vehicle"). The VICS™ antenna 94b receives information about traffic congestion, regulatory information, disaster information, etc. from a system, such as an information center, located outside the vehicle. The display 96 displays the information concerning the current location of the subject vehicle, a scheduled traveling route to a destination, and so forth, and also allows the operator to enter commands. Here, the map information includes service information (such as sightseeing information and parking), and road information on each of predetermined traveling sections (between signals or between intersections, for example), which are stored in the form of databases. The road information includes distance information, road width information, information about the number of traffic lanes, regional information (e.g., an urban area, a suburban area), road type information (e.g., a general road, an express highway), road gradient information, legal speed, the number of traffic signals, and so forth. The navigation system 90 is connected to the HVECU 70 via the communication port.

Although not illustrated in the drawings, the HVECU 70 is configured as a microprocessor having a CPU as a main component, and includes a ROM that stores processing programs, a RAM that temporarily stores data, input and output ports, and a communication port, as well as the CPU. The HVECU 70 receives signals from various sensors, via the input port. The signals received by the HVECU 70 include, for example, an ignition signal from an ignition switch 80, and a shift position SP from a shift position sensor 82 that detects a position to which a shift lever 81 is operated. The signals also include an accelerator operation amount Acc from an accelerator pedal position sensor 84 that detects the amount of depression of an accelerator pedal 83, a brake pedal position BP from a brake pedal position sensor 86 that detects the amount of depression of a brake pedal 85, and a vehicle speed V from a vehicle speed sensor 88. As described above, the HVECU 70 is connected to the engine ECU 24, motor ECU 40, battery ECU 52, and the navigation system 90, via the communication port.

The hybrid vehicle 20 of the embodiment constructed as described above travels in a hybrid traveling mode (HV traveling mode) in which the vehicle 20 travels with the engine 22 being operated, or in an electric traveling mode (EV traveling mode) in which the vehicle 20 travels with the engine 22 stopped.

Figure 2:
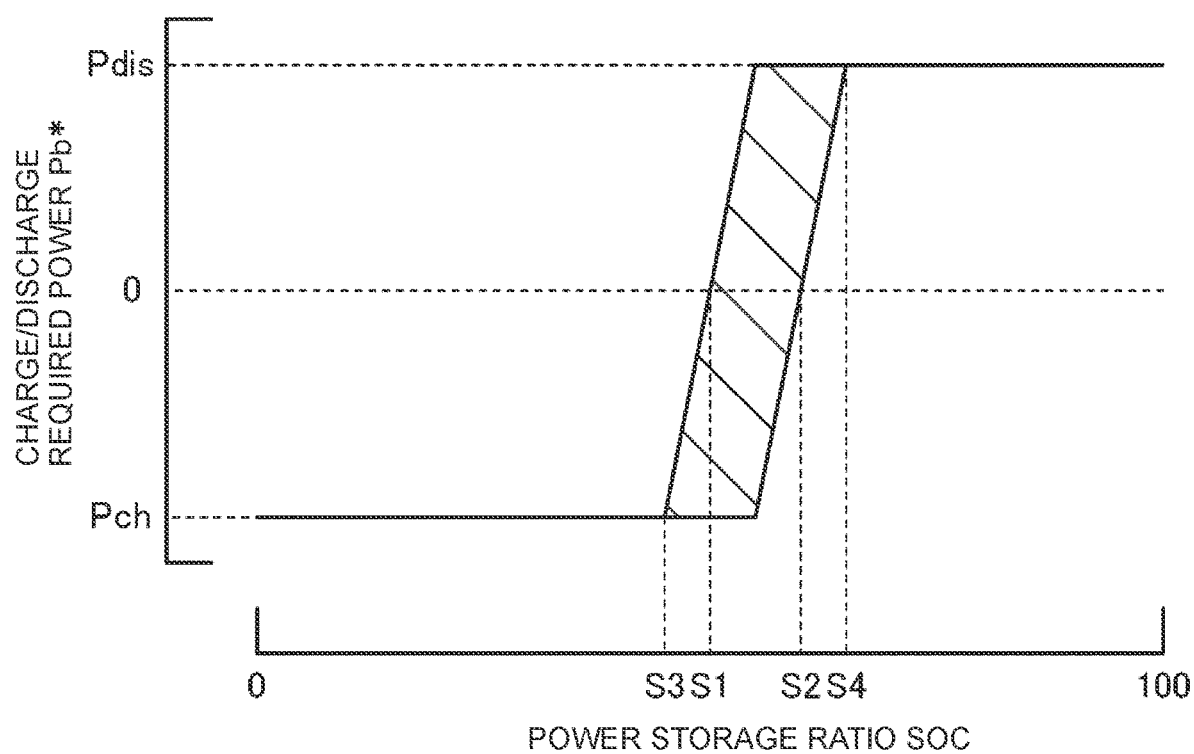
FIG. 2 is an explanatory view showing one example of a map generally used at the time of control for setting charge/discharge required power.

In the HV traveling mode, the HVECU 70 sets a required torque Td* required by the drive shaft 36, based on the accelerator operation amount Acc and the vehicle speed V, and calculates a required power Pd* required by the drive shaft 36, by multiplying the set required torque Td*, by the rotational speed Nd of the drive shaft 36 (the rotational speed Nm2 of the motor MG2). Then, the HVECU 70 sets charge/discharge required power Pb* (having a positive value when electricity is discharged from the battery 50) required by the battery 50, based on the power storage ratio SOC of the battery 50, and sets a required power Pe* required by the engine 22, by subtracting the charge/discharge required power Pb* from the required power Pd*. Basically (when charge control for congestion (charge control) as described later is not pertained), the charge/discharge required power Pb* of the battery 50 is set based on a map that is generally used at the time of control for setting the charge/discharge required power as shown in FIG. 2 and the required power Pd*, to be within a range that is equal to or larger than a negative value of maximum charge power Pch (e.g., several kilowatts (kW)) and equal to or smaller than a positive value of maximum discharge power Pdis (e.g., +several kilowatts (kW)), so that the power storage ratio SOC of the battery 50 falls within a control range that is equal to or larger than a value S1 (e.g., 50%) and equal to or smaller than a value S2 (e.g., 60%), and the engine 22 can operate with high efficiency (the required power Pe* becomes equal to a value at which the engine 22 can operate with high efficiency). More specifically, the charge/discharge required power Pb* is set so that the engine 22 can operate with high efficiency within a hatched area of the map that is generally used at the time of control for setting the charge/discharge required power shown in FIG. 2, when the power storage ratio SOC of the battery 50 is within a range that is larger than a value S3 (e.g., 45%) that is smaller than the value S1, and is smaller than a value S4 (e.g., 65%) that is larger than the value S2. The charge/discharge required power Pb* is set to the value Pch when the power storage ratio SOC of the battery 50 is within a range equal to or smaller than the value S3, and is set to the value Pdis when the power storage ratio SOC of the battery 50 is within a range equal to or larger than the value S4.

Then, a target rotational speed Ne* and a target torque Te* of the engine 22, and the torque commands Tm1*, Tm2* of the motors MG1, MG2 are set, so that the required power Pe* is generated from the engine 22, and the required torque Td* is delivered to the drive shaft 36. Then, the target rotational speed Ne* and the target torque Te* of the engine 22 are transmitted to the engine ECU 24, and the torque commands Tm1*, Tm2* of the motors MG1, MG2 are transmitted to the motor ECU 40. When the engine ECU 24 receives the target rotational speed Ne* and the target torque Te* of the engine 22, it controls operation of the engine 22 (e.g., performs intake air amount control, fuel injection control, ignition control, etc.), so that the engine 22 is operated based on the target rotational speed Ne* and the target torque Te*. When the motor ECU 40 receives the torque commands Tm1*, Tm2* of the motors MG1, MG2, it performs drive control of the motors MG1, MG2 (more specifically, performs switching control of a plurality of switching devices of the inverters 41, 42), so that the motors MG1, MG2 are driven according to the torque commands Tm1*, Tm2*.

In the HV traveling mode, when a stop condition of the engine 22 is established, such as when the power storage ratio SOC of the battery 50 is larger than a threshold value Sref (e.g., 40%) that is smaller than the above value S3, and the required power Pe* becomes smaller than a threshold value Pref, operation of the engine 22 is stopped, and the hybrid vehicle 20 makes a transition to the EV traveling mode. Basically (when the charge control for congestion as described later is not performed), a value P1 (e.g., 10 kW) is used as the threshold value Pref. Pref is a threshold in which the engine 22 started when the required power Pe* calculated in the same manner as in the HV traveling mode becomes equal to or later than the threshold value Pref.

In the EV traveling mode, the HVECU 70 sets the required torque Td*, based on the accelerator operation amount Acc and the vehicle speed V, sets the torque command Tm1* of the motor MG1 to a value 0, and sets the torque command Tm2* of the motor MG2 so that the required torque Td* is delivered to the drive shaft 36. Then, the HVECU 70 transmits the torque commands Tm1*, Tm2* of the motors MG1, MG2 to the motor ECU 40. The drive control of the motors MG1, MG2 performed by the motor ECU 40 has been described above.

In the EV traveling mode, when a start condition of the engine 22 is established, such as when the power storage ratio SOC of the battery 50 becomes equal to or smaller than the threshold value Sref, or the required power Pe* calculated in the same manner as in the HV traveling mode becomes equal to or larger than the threshold value Pref, the engine 22 is started, and the hybrid vehicle 20 makes a transition to the HV traveling mode.

In the hybrid vehicle 20 of the embodiment, when a destination is set by the driver, the navigation system 90 searches for a recommended route from the current location of the subject vehicle to the destination, based on the map information, the current location of the subject vehicle, and the destination, and outputs the recommended route as a scheduled traveling route, to the display 96, so as to provide route guidance. Also, when the subject vehicle deviates from the scheduled traveling route, during traveling on the scheduled traveling route, the navigation system 90 re-searches for a recommended route from the current location of the subject vehicle to the destination, and changes the scheduled traveling route from the recommended route before re-searching, to the recommended route obtained by re-searching, to provide route guidance. Further, when it is determined (predicted), during traveling on the scheduled traveling route, that a congestion zone is included in the scheduled traveling route (the scheduled traveling route is a congestion go-through route including a congestion zone), based on congestion information from the VICS™ antenna 94b, a congestion avoidance route that enables the hybrid vehicle 20 to circumvent or avoid the congestion zone and reach the destination from the current location of the subject vehicle is re-searched for as the recommended route. When there is a congestion avoidance route, the navigation system 90 changes the scheduled traveling route from the recommended route (congestion go-through route) before re-searching, to the recommended route (congestion avoidance route) obtained by re-searching, to provide route guidance. When there is no congestion avoidance route, the navigation system 90 keeps the recommended route (congestion go-through route) before re-searching, as the scheduled traveling route, to provide route guidance.

In the embodiment, the "congestion zone" means a traffic congestion zone in which forced charge of the battery 50 may be conducted, more specifically, a traffic congestion zone having distance L1 (e.g., several hundreds of meters to several kilometers). As the distance L1, a uniform value may be used, or a value that varies according to the type information (a general road, an express highway), the legal speed, etc. included in the road information may be used. For example, a larger value may be used for an express highway, than that for a general road. The forced charge of the battery 50 means charging the battery 50 with an operation of the engine 22 and a power generation of the motor MG1, irrespective of the required power Pe*, when the power storage ratio SOC of the battery 50 becomes equal to or smaller than the threshold value Sref. If the forced charge of the battery 50 is conducted when the required power Pd* (required power Pe*) is small, the engine 22 is operated at an operating point (determined by the rotational speed and torque) at which the efficiency is not so high, which is not desirable in terms of the energy efficiency.

Figure 3:
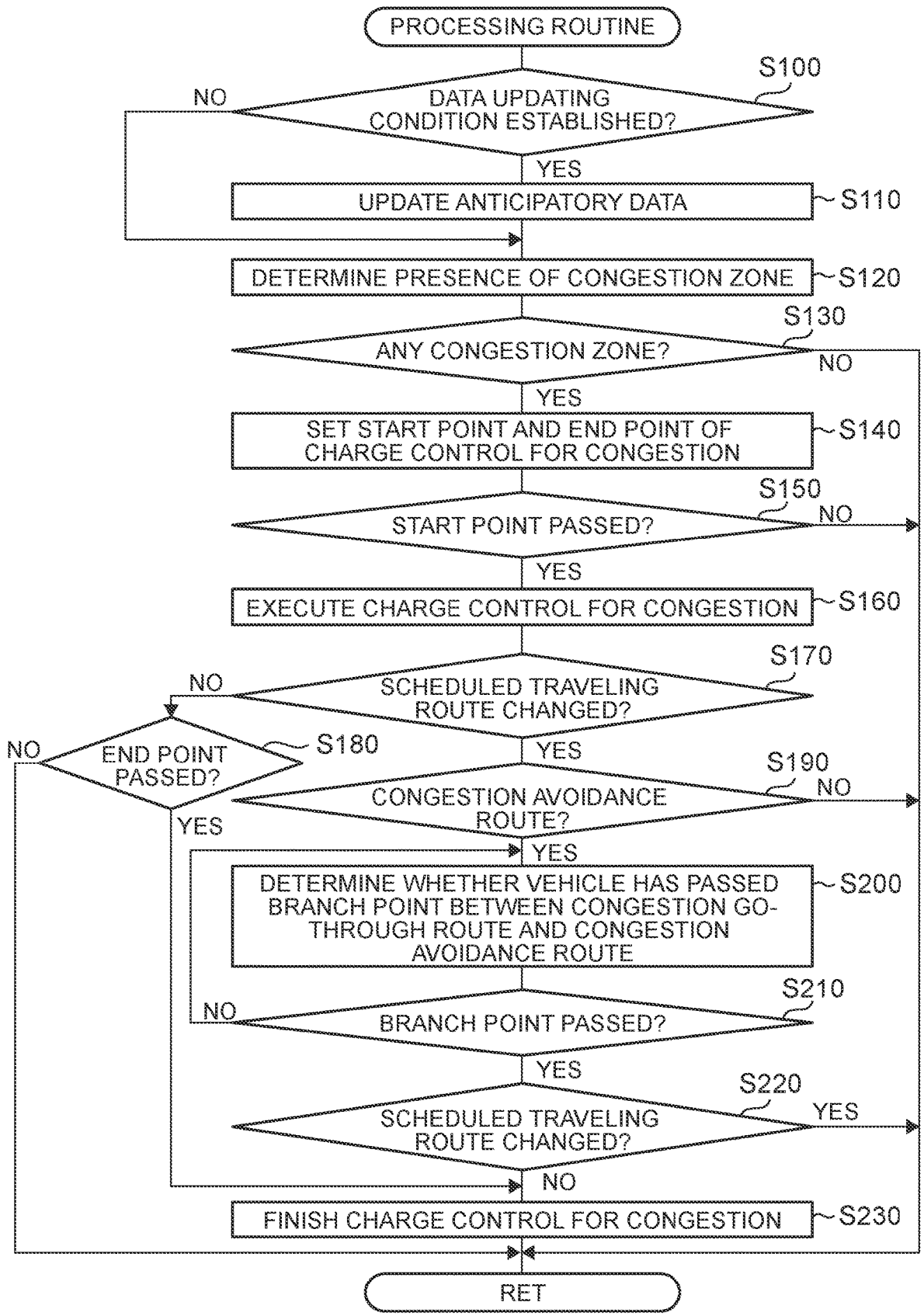
FIG. 3 is a flowchart illustrating one example of a processing routine executed by an HVECU.

Next, operation of the hybrid vehicle 20 of the embodiment constructed as described above, in particular, operation performed when the navigation system 90 provides route guidance to guide the driver along the scheduled traveling route to the destination, will be described. FIG. 3 is a flowchart illustrating one example of a processing routine repeatedly executed by the HVECU 70 at this time. The repeated execution of this routine ends, when the subject vehicle arrives at the destination, or when the route guidance along the scheduled traveling route is finished based on operation of the driver (e.g., cancellation of the destination), or when the ignition switch 80 is turned off, for example. If the charge control for congestion as described later is performed at this time, execution of the control is also finished.

Once the processing routine of FIG. 3 is executed, the HVECU 70 determines whether an updating condition is established (step S100). When the updating condition is established, anticipatory data, such as road information and congestion information on each traveling section (for example, each traveling section from the current location of the subject vehicle, to a point closer to the destination by a predetermined distance L2 (e.g., 10 km) than the current vehicle location) of the scheduled traveling route from the current location of the subject vehicle to the destination, is updated. When the HVECU 70 determines that the data updating condition is established, it receives the anticipatory data from the navigation system 90, and updates the data (step S110). When the HVECU 70 determines that the data updating condition is not established, the anticipatory data is not updated. As the data updating condition, a condition that the scheduled traveling route has been changed after the last updating of the anticipatory data, a condition that elapsed time Ta from the last updating of the anticipatory data is equal to or longer than a predetermined time T1 (e.g., several minutes), a condition that the traveling distance from the last updating of the anticipatory data is equal to or longer than a predetermined distance L3 (e.g., several hundreds of meters), or the like, may be used. Only one of these conditions may be used, or two or more of these conditions may be combined, and used as an OR condition.

Then, the HVECU 70 determines, based on the anticipatory data, whether a congestion zone is included in the scheduled traveling route (whether the scheduled traveling route is a congestion go-through route) (steps S120, S130). When the HVECU 70 determines that no congestion zone is included in the scheduled traveling route (the scheduled traveling route is not a congestion go-through route), the current cycle of this routine ends. If the charge control for congestion that will be described later is executed at this time, the execution is also finished.

When the HVECU 70 determines in steps S120, S130 that a congestion zone is included in the scheduled traveling route (i.e., the scheduled traveling route is a congestion go-through route), it sets a start point and an end point of the charge control for congestion that will be described later, based on the anticipatory data (step S140). In this embodiment, the start point and the end point of the charge control for congestion are set to a point located ahead of a start point of the congestion zone by distance L4 (e.g., several kilometers (km)), and an end point of the congestion zone, respectively. As the distance L4, a uniform value may be used, or a value that varies according to the type information (a general road, an express highway) and the legal speed included in the road information, may be used. For example, a larger value may be used for an express highway, than that for a general road.

Then, the HVECU 70 receives the current location of the subject vehicle from the navigation system 90, and determines whether the subject vehicle passes (or has already passed) the start point of the charge control for congestion (step S150). If the HVECU 70 determines that the subject vehicle has not passed the start point of the charge control for congestion, the current cycle of this routine ends.

Figure 4:
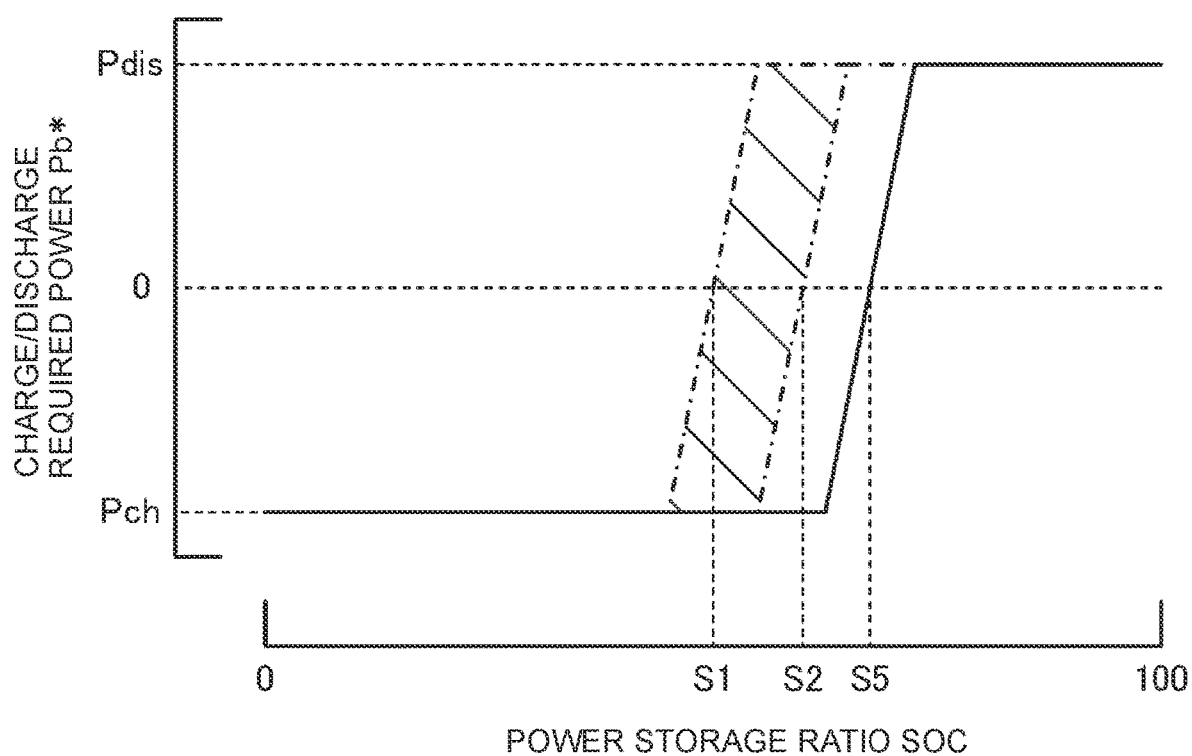
FIG. 4 is an explanatory view showing one example of a map for setting charge/discharge required power, for use in the case of traffic congestion.

When the HVECU 70 determines in step S150 that the subject vehicle passes (or has already passed) the start point of the charge control for congestion, it executes the charge control for congestion (step S160). Thus, a first point in time is directed to a time point of execution of charge control for congestion at step S160 shown in FIG. 3. The start point of the charge control for congestion at step S160 is exemplified as a point located before a start point congestion zone by distance L4. The charge control for congestion is to control the engine 22 and the motors MG1, MG2 so that the power storage ratio SOC of the battery 50 becomes higher than that in the case where the scheduled traveling route includes no congestion zone. In the embodiment, as the charge control for congestion, the threshold value Pref (threshold value used for determining stop/start of the engine 22) is set to a value P2 (e.g., several kilowatts (kW)) smaller than the value P1, and the charge/discharge required power Pb* of the battery 50 is set, using a map for setting the charge/discharge required power for congestion as shown in FIG. 4, such that the power storage ratio SOC of the battery 50 becomes closer to a value S5 (e.g., 65%) that is larger than the value S2. In the map of FIG. 4 for setting the charge/discharge required power for congestion, the map of FIG. 2 for setting the charge/discharge required power is indicated by one-dot chain lines, for the sake of reference. When the charge control for congestion is performed, the charge/discharge required power Pb* of the battery 50 is set to a value 0 when the power storage ratio SOC of the battery 50 is equal to the value S5, and is set to a negative value within a range equal to or larger than the value Pch when the power storage ratio SOC of the battery 50 is smaller than the value S5, while it is set to a positive value within a range equal to or smaller than the value Pdis when the power storage ratio SOC of the battery 50 is larger than the value S5, as shown in FIG. 4. As the charge control for congestion is perk), rued in this manner, the HV traveling mode is more likely to be selected from the HV traveling mode and the EV traveling mode (the engine 22 is more likely to be operated), and the power storage ratio SOC of the battery 50 is more likely to be high, because the charge/discharge required power Pb* of the battery 50 in the HV traveling mode is reduced, and the required power Pe* is increased. The execution of the charge control for congestion is started when the subject vehicle passes the point located ahead of the start point of the congestion zone by the distance L4, so that the power storage ratio SOC of the battery 50 can be made sufficiently high by the time when the subject vehicle enters the congestion zone.

Then, the HVECU 70 receives the scheduled traveling route from the navigation system 90, and determines whether the scheduled traveling route has been changed (step S170). Then, when the HVECU 70 determines that the scheduled traveling route is not changed (but remains the congestion go-through route), it receives the current location of the subject vehicle from the navigation system 90, and determines whether the subject vehicle has passed the end point of the charge control for congestion (the end point of the congestion zone) (step S180). Thus, a second point in time is directed to a time point at which the hybrid vehicle passes the end point of the charge control for congestion at step S180 shown in FIG. 3. When the HVECU 70 determines that the subject vehicle has not passed the end point of the charge control for congestion, it finishes the current cycle of this routine, without finishing the charge control for congestion. Then, the HVECU 70 repeatedly executes steps S100 to S180, while waiting for the subject vehicle to pass the end point of the charge control for congestion (the end point of the congestion zone). When the HVECU 70 determines in step S180 that the subject vehicle has passed the end point of the charge control for congestion, it finishes the charge control for congestion (step S230), and finishes the current cycle of the routine. In this case, the charge control for congestion continues to be performed, from the time when the subject vehicle passes the start point of the charge control for congestion (the point located ahead of the start point of the congestion zone by the distance L4), to the time when the subject vehicle passes the end point of the charge control for congestion (the end point of the congestion zone). As a result, in the congestion zone, the power storage ratio SOC of the battery 50 is prevented from being equal to or smaller than the threshold value Sref, and the forced charge of the battery 50 is less likely or unlikely to take place.

When the HVECU 70 determines in step S170 that the scheduled traveling route has been changed, it determines whether the scheduled traveling route that has been changed is a congestion avoidance route (step S190). When the HVECU 70 determines that the scheduled traveling route that has been changed is not a congestion avoidance route, it determines that the scheduled traveling route may be another congestion go-through route different from the congestion go-through route established before the change of the route. In this case, the HVECU 70 finishes the current cycle of the routine, without finishing the charge control for congestion.

When the HVECU 70 determines in step S190 that the scheduled traveling route that has been changed is a congestion avoidance route, it receives the current location of the subject vehicle from the navigation system 90, and determines whether the subject vehicle has passed a branch point between the congestion go-through route and the congestion avoidance route, based on the current location of the subject vehicle, congestion go-through route (route before being changed), and the congestion avoidance route (route after being changed) (step S200, S210). When the HVECU 70 determines that the subject vehicle has not passed the branch point, it waits until the subject vehicle passes the branch point. While the HVECU 70 is waiting, it continues to perform the charge control for congestion.

When the HVECU 70 determines in steps S200, S210 that the subject vehicle has passed the branch point, it receives the scheduled traveling route from the navigation system 90, and determines whether the scheduled traveling route has been changed (step S220). When the HVECU 70 determines that the scheduled traveling route has not been changed (but remains the congestion avoidance route), it determines that the subject vehicle is traveling on the congestion avoidance route, and finishes execution of the charge control for congestion (step S230). Then, the HVECU 70 finishes the current cycle of this routine. When the subject vehicle travels on the congestion avoidance route after passing the branch point, it does not pass any congestion zone; therefore, the HVECU 70 finishes execution of the charge control for congestion, so that the charge control for congestion can be prevented from being continued wastefully.

When the HVECU 70 determines in step S220 that the scheduled traveling route has been changed (it is no longer the congestion avoidance route), it determines that the subject vehicle is traveling on the congestion go-through route, and finishes the current cycle of this routine, without finishing execution of the charge control for congestion. Then, if the scheduled traveling route is not changed after that (if it remains the congestion go-through route), the HVECU 70 repeatedly executes steps S100 to S180, to wait for the subject vehicle to pass the end point of the charge control for congestion (the end point of the congestion zone). When the HVECU 70 determines in step S180 that the subject vehicle has passed the end point of the charge control for congestion, it finishes execution of the charge control for congestion (step S230), and finishes the current cycle of this routine. As a case where the HVECU 70 changes the scheduled traveling route from the congestion avoidance route to the congestion go-through route after the subject vehicle passes the branch point, it may be considered that, even though the HVECU 70 changed the scheduled traveling route from the congestion go-through route to the congestion avoidance route during execution of the charge control for congestion, the driver does not notice the change of the scheduled traveling route to the congestion avoidance route, or ignores the change, and continues to have the vehicle travel on the congestion go-through route after the subject vehicle passes the branch point between the congestion go-through route and the congestion avoidance route. In this case, according to this embodiment, execution of the charge control for congestion is continued, until the subject vehicle passes the branch point after changing the scheduled traveling route from the congestion go-through route to the congestion avoidance route, and after the subject vehicle passes the branch point, and continues to travel on the congestion go-through route, to which the scheduled traveling route is re-changed. Therefore, as compared with the case where execution of the charge control for congestion is interrupted from the time when the scheduled traveling route is changed to the congestion avoidance route until the subject vehicle passes the branch point, the power storage ratio SOC of the battery 50 can be made sufficiently high, by the time when the subject vehicle enters the congestion zone. As a result, the power storage ratio SOC of the battery 50 is prevented from being equal to or smaller than the threshold value Sref, and forced charge of the battery 50 is less likely or unlikely to take place.

Figure 5:
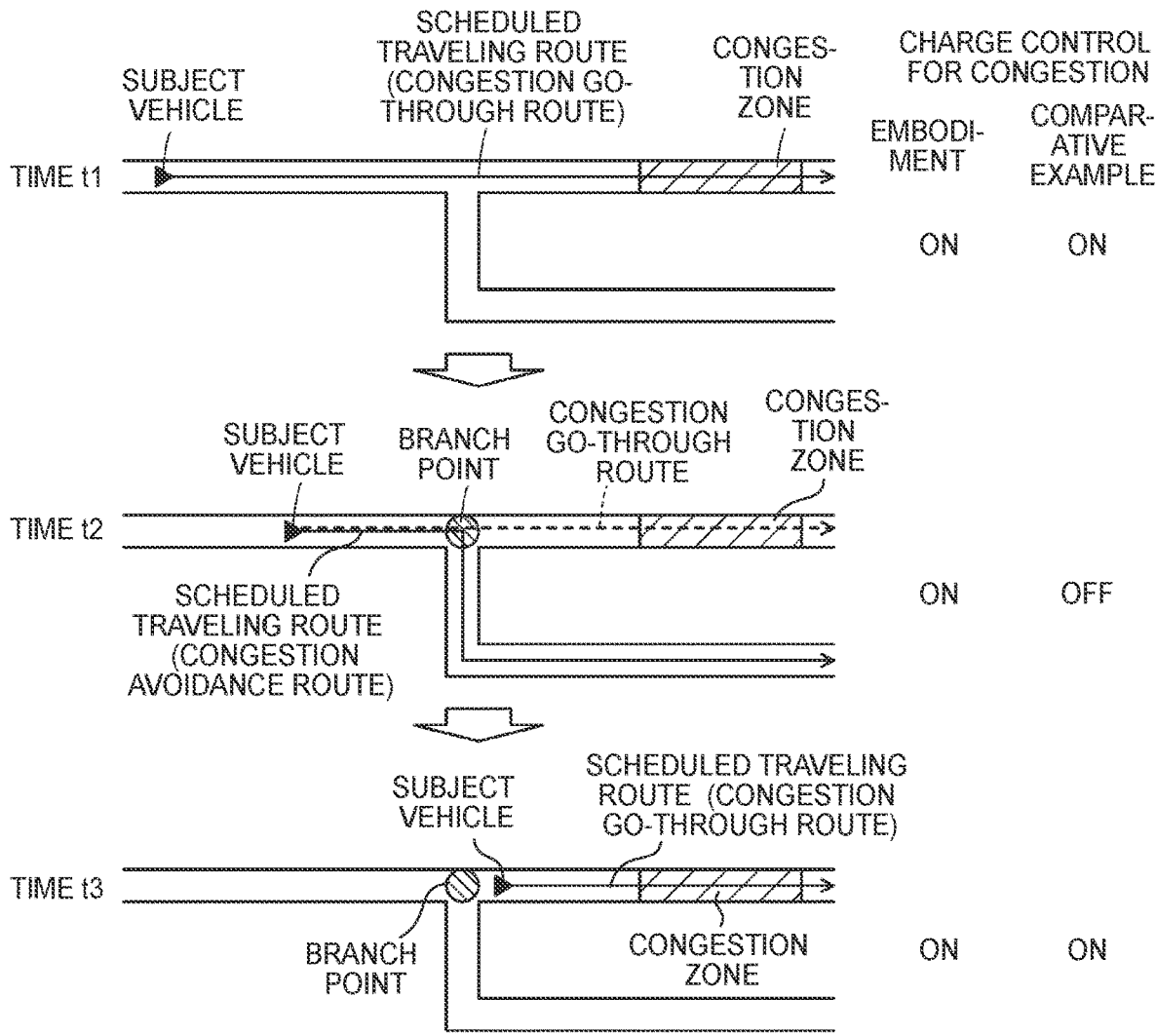
FIG. 5 is an explanatory view showing execution or non-execution of charge control for congestion at each point in time, in the embodiment and a comparative example.

FIG. 5 shows execution (ON) or non-execution (OFF) of the charge control for congestion at each point in time, in the embodiment and a comparative example. In the comparative example, when the scheduled traveling route is changed from the congestion go-through route to the congestion avoidance route during execution of the charge control for congestion, execution of the charge control for congestion is immediately finished. FIG. 5 illustrates the case where the scheduled traveling route is a congestion go-through route, from before time t1 to time t2, and the scheduled traveling route is changed from the congestion go-through route to a congestion avoidance route at time t2; however, the driver does not notice the change of the scheduled traveling route to the congestion avoidance route, or ignores the change, and continues to have the vehicle travel on the congestion go-through route after the subject vehicle passes a branch point between the congestion go-through route and the congestion avoidance route. Then, at time t3, the scheduled traveling route is re-changed from the congestion avoidance route to the congestion go-through route. In the comparative example, the charge control for congestion is executed from a point in time before time t1, but execution of the charge control for congestion is finished at time t2, and execution of the charge control for congestion is resumed at time t3. In this comparative example, since the charge control for congestion is once interrupted, the power storage ratio SOC of the battery 50 may not be sufficiently high when the subject vehicle enters the congestion zone, and the power storage ratio SOC of the battery 50 may be reduced to be equal to or smaller than the threshold value Sref, causing forced charge of the battery 50, in the congestion zone. On the other hand, in the embodiment, execution of the charge control for congestion is continued even after time t2, and execution of the charge control for congestion is further continued after time t3. In this embodiment, since the charge control for congestion is continued (not interrupted) until the subject vehicle enters the congestion zone, the power storage ratio SOC of the battery 50 can be made sufficiently high, by the time when the subject vehicle enters the congestion zone. As a result, in the congestion zone, the power storage ratio SOC of the battery 50 is prevented from being equal to or smaller than the threshold value Sref, and the battery 50 can be prevented from being forcedly charged. As described above, execution of the charge control for congestion is finished, when the subject vehicle travels on the congestion avoidance route after passing the branch point (when the scheduled traveling route remains the congestion avoidance route); therefore, the charge control for congestion can be prevented from continuing to be performed wastefully.

In the hybrid vehicle 20 of the embodiment as described above, even if the scheduled traveling route is changed from the congestion go-through route to the congestion avoidance route during execution of the charge control for congestion, the charge control for congestion continues to be performed until the subject vehicle passes the branch point between the congestion go-through route and the congestion avoidance route, and the charge control for congestion further continues to be performed, when the subject vehicle keeps traveling on the congestion go-through route after passing the branch point, and the scheduled traveling route is re-changed to the congestion go-through route. In this case, execution of the charge control for congestion is continued (not interrupted) until the subject vehicle enters the congestion zone. Thus, when the driver does not notice a change of the scheduled traveling route to the congestion avoidance route or ignores the change, and the subject vehicle keeps traveling on the congestion go-through route and enters the congestion zone, the power storage ratio SOC of the battery 50 can be made sufficiently high by the time when the subject vehicle enters the congestion zone. As a result, in the congestion zone, the power storage ratio SOC of the battery 50 can be prevented from being reduced to be equal to or smaller than the threshold value Sref, and the battery 50 can be prevented from being forcedly charged.

In the hybrid vehicle 20 of the embodiment, when the charge control for congestion is performed, it is uniformly performed. However, the charge control for congestion may be performed such that the power storage ratio SOC of the battery 50 is reduced until the subject vehicle passes the branch point after a change of the scheduled traveling route to the congestion avoidance route, as compared with the case where the scheduled traveling route is not changed (i.e., where it remains the congestion go-through route). For example, the control may be performed in the following manner. When the HVECU 70 determines in step S170 of the processing routine of FIG. 3 that the scheduled traveling route is not changed (it remains the congestion go-through route), it sets the threshold value Pref to the value P2, and sets the charge/discharge required power Pb* of the battery 50 so that the power storage ratio SOC of the battery 50 becomes close to the value S5. Also, when the HVECU 70 determines in step S170 that the scheduled traveling route has been changed, and determines in step S190 that the scheduled traveling route that has been changed is a congestion avoidance route, it sets the threshold value Pref to a value P3 that is smaller than the value P1 and larger than the value P2, and sets the charge/discharge required power Pb* of the battery 50 so that the power storage ratio SOC of the battery 50 becomes close to a value S6 that is larger than the value S2 and smaller than the value S6. Since it is unknown whether the subject vehicle will travel on the congestion go-through route or the congestion avoidance route, until the subject vehicle passes the branch point between the congestion go-through route and the congestion avoidance route, after a change of the scheduled traveling route to the congestion avoidance route, it may be considered to perform the above control, in view of a possibility that the subject vehicle travels on the congestion avoidance route.

In the hybrid vehicle 20 of the embodiment, the end point of the charge control for congestion is set to the end point of the congestion zone. However, the end point of the charge control for congestion may be set to the start point of the congestion zone, or may be set to a point located slightly (by a given distance) ahead of the end point of the congestion zone.

In the hybrid vehicle 20 of the embodiment, when the charge control for congestion is performed, the threshold value Pre is set to the value P2 that is smaller than the value P1, and the charge/discharge required power Pb* of the battery 50 is set so that the power storage ratio SOC of the battery 50 becomes close to the value S5 that is larger than the value S2. However, only one of these settings may be conducted.

In the hybrid vehicle 20 of the embodiment, the battery 50 is used as the power storage device. However, the power storage device may be any device capable of storing electric power. For example, a capacitor may be used.

The hybrid vehicle 20 of the embodiment includes the navigation system 90 having the main body 92, GPS antenna 94a, VICS™ antenna 94a, and the display 96. However, the hybrid vehicle may include on-board communication equipment, in place of or in addition to the navigation system 90, and communications may be conducted between the HVECU 70 and a system, such as an information sensor, outside the vehicle, via the on-board communication equipment. When the hybrid vehicle includes on-board communication equipment without including the navigation system 90, it is preferable to use equipment in which a GPS antenna is incorporated, as the on-board communication equipment. In this case, the HVECU 70 or the system outside the vehicle may set a scheduled traveling route, based on the current location of the subject vehicle from the GPS antenna, map information possessed by the system outside the vehicle, and so forth, and the scheduled traveling route may be displayed on an on-board display.

While the hybrid vehicle 20 of this embodiment includes the engine ECU 24, motor ECU 40, battery ECU 52, and the HVECU 70, at least two of these ECUs may constitute a single electronic control unit.

Figure 6:
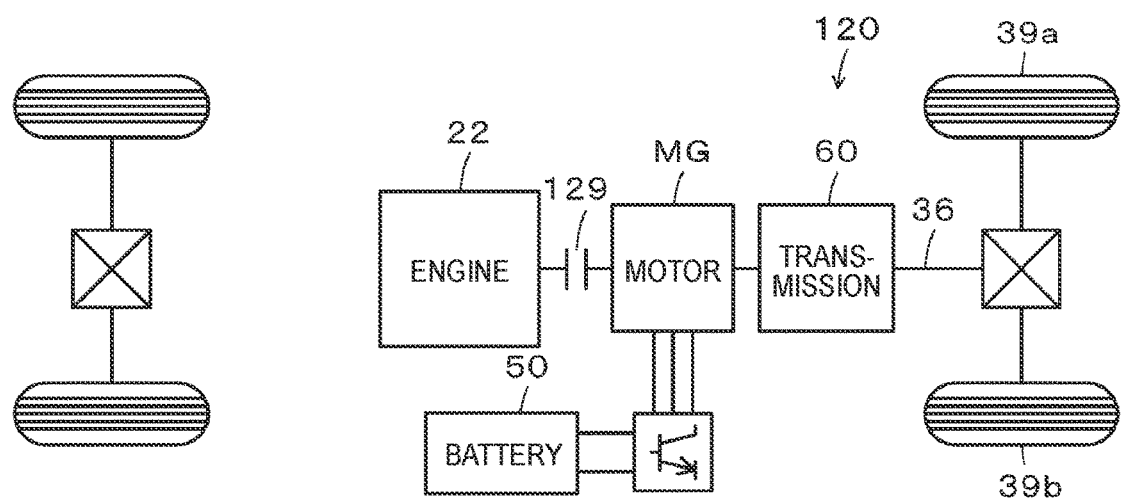
FIG. 6 is a view schematically showing the configuration of a hybrid vehicle of a modified example.
Figure 7:
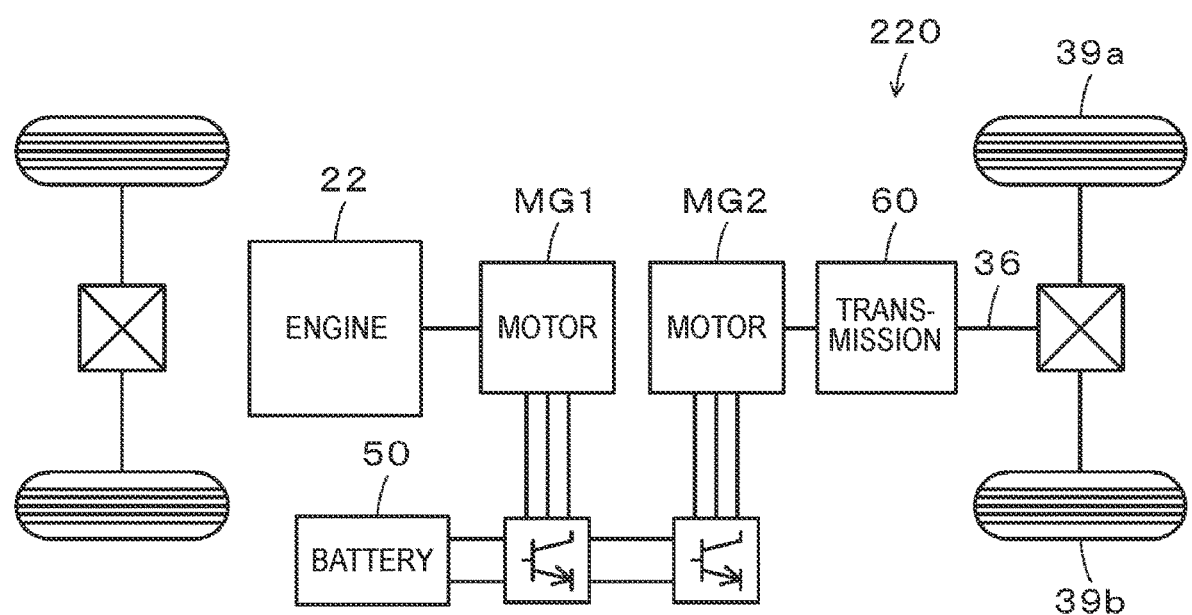
FIG. 7 is a view schematically showing the configuration of a hybrid vehicle of, another modified example.

In the hybrid vehicle 20 of the embodiment, the engine 22 and the motor MG1 are connected to the drive shaft 36 coupled to the drive wheels 39a, 39b, via the planetary gear set 30, and the motor MG2 is connected to the drive shaft 36. However, as in a hybrid vehicle 120 of a modified example shown in FIG. 6, a motor MG may be connected to the drive shaft 36 coupled to the drive wheels 39a, 39b, via a transmission 60, and the engine 22 may be connected to a rotary shaft of the motor MG, via a clutch 129. Also, like a hybrid vehicle 220 of another modified example shown in FIG. 7, the hybrid vehicle may be a so-called series hybrid vehicle in which a motor MG1 for power generation is connected to an output shaft of the engine 22, and a motor MG2 for traveling is connected to the drive shaft 36 coupled to the drive wheels 39a, 39b, via a transmission 60.

The correspondence relationship between the main elements of the embodiment, and the main elements of the disclosure described in "SUMMARY" above will be described. In the embodiment, the engine 22 corresponds to "engine", and the motor MG1 corresponds to "motor", while the battery 50 corresponds to "power storage device", and the HVECU 70, engine ECU 24, motor ECU 40, and the navigation system 90 correspond to "electronic control unit".

The correspondence relationship between the main elements of the embodiment, and the main elements of the disclosure described in "SUMMARY" above is one example for specifically explaining a mode for carrying out the disclosure as described in the "SUMMARY"; therefore, it should not limit the elements of the disclosure described in the "SUMMARY". Namely, the disclosure described in the "SUMMARY" should be interpreted based on the description in the "SUMMARY", and the embodiment is a mere specific example of the disclosure described in the "SUMMARY".

While the mode for carrying out the disclosure has been described using the embodiment, it is to be understood that the disclosure is by no means limited to the embodiment, but may be embodied in various forms, without departing from the scope of the disclosure.

This disclosure can be applied to manufacturing industries of hybrid vehicles, for example.

What is claimed is:

1. A hybrid vehicle comprising:
    an engine;
    a motor connected to an output shaft of the engine;
    a power storage device configured to supply and receive electric power to and from the motor; and
    an electronic control unit configured to:
        provide route guidance of a scheduled traveling route,
        perform charge control for controlling the engine and the motor such that a power storage ratio of the power storage device when the electronic control unit determines that the scheduled traveling route includes a traffic congestion zone based on traffic congestion information is higher than a power storage ratio of the power storage device when the electronic control unit determines that the scheduled traveling route does not include the traffic congestion zone based on the traffic congestion information, from a first point in time at which the hybrid vehicle passes a first location located before a start of the traffic congestion zone, to a second point in time at which the hybrid vehicle passes a predetermined location, and
        continue execution of the charge control until the hybrid vehicle passes a branch point, which is a location at which the scheduled traveling route is divided into a congestion go-through route and a congestion avoidance route, when the electronic control unit changes the scheduled traveling route from the congestion go-through route including the traffic congestion zone, to the congestion avoidance route for avoiding the traffic congestion zone by traveling on a route different from the congestion go-through route, during execution of the charge control.

2. The hybrid vehicle according to claim 1, wherein the electronic control unit is configured to finish execution of the charge control, when the scheduled traveling route is the congestion avoidance route after the hybrid vehicle passes the branch point.

3. The hybrid vehicle according to claim 1, wherein the electronic control unit is configured to perform the charge control such that the power storage ratio of the power storage device when the scheduled traveling route is changed to the congestion avoidance route is lower than the power storage ratio of the power storage device when the scheduled traveling route remains the congestion go-through route, until the hybrid vehicle passes the branch point.

4. The hybrid vehicle according to claim 1, wherein the predetermined location is selected from an end point of the traffic congestion zone, a start point of the traffic congestion zone, and a point located ahead of the end point of the traffic congestion zone.

5. A method of controlling a hybrid vehicle, the hybrid vehicle including an engine, a motor connected to an output shaft of the engine, a power storage device configured to supply and receive electric power to and from the motor, and an electronic control unit,
    the method comprising:
        providing, by the electronic control unit, route guidance of a scheduled traveling route;
        performing, by the electronic control unit, charge control for controlling the engine and the motor such that a power storage ratio of the power storage device when the electronic control unit determines that the scheduled traveling route includes a traffic congestion zone based on traffic congestion information is higher than a power storage ratio of the power storage device when the electronic control unit determines that the scheduled traveling route does not include the traffic congestion zone based on the traffic congestion information, from a first point in time at which the hybrid vehicle passes a first location located before a start of the traffic congestion zone, to a second point in time at which the hybrid vehicle passes a predetermined location; and
        continuing, by the electronic control unit, execution of the charge control until the hybrid vehicle passes a branch point, which is a location at which the scheduled traveling route is divided into a congestion go-through route and a congestion avoidance route, when the electronic control unit changes the scheduled traveling route from the congestion go-through route including the traffic congestion zone, to the congestion avoidance route for avoiding the traffic congestion zone by traveling on a route different from the congestion go-through route, during execution of the charge control.

6. The hybrid vehicle according to claim 1, wherein the electronic control unit is configured to continue execution of the charge control after the hybrid vehicle passes the branch point, when the electronic control unit changes the scheduled traveling route from the congestion go-through route including the traffic congestion zone and determines that the scheduled traveling route that has been changed is not a congestion avoidance route, during execution of the charge control.

* * * * *